United States Patent Office  3,754,010
Patented Aug. 21, 1973

3,754,010
CO-OXIDATION PROCESS FOR THE PRODUCTION OF SYNTHETIC FATTY ACIDS
Karl P. Kammann, Jr., Cincinnati, Ohio, assignor to Emery Industries, Inc., Cincinnati, Ohio
No Drawing. Filed May 3, 1971, Ser. No. 139,898
Int. Cl. C08h, 17/36
U.S. Cl. 260—413                     7 Claims

ABSTRACT OF THE DISCLOSURE

A co-oxidation process is provided whereby aliphatic monocarboxylic acids are obtained by the autoxidation of paraffin/olefin mixtures in the presence of a catalyst at atmospheric pressure. The process provides efficient oxidation of both the paraffin and the olefin at low temperatures while maintaining acceptable reaction rates and gives an improved distribution to a narrow range of preferred synthetic fatty acids.

BACKGROUND OF THE INVENTION

The oxidation of paraffinic hydrocarbons to obtain fatty acids is known and numerous catalyst systems and oxidation techniques have been reported. Such processes are not without disadvantages however. They typically yield a wide distribution of acids having nearly all possible chain lengths below that of the starting paraffin—the distribution following a curve peaking at about half the number of carbon atoms of the starting paraffin. They also produce intermediate products such as secondary alcohols and ketones and numerous by-products such as keto, hydroxy and other oxygenated acids, lactones and dark-colored resinous polymeric materials. The wide distribution of acids and numerous by-products are the result of lack of selectivity of the point of oxidation of the molecule. Certain points within the molecules may be more susceptible to oxidative attack than others but such sensitization is generally very minor.

A method for sensitizing the molecule and increasing the selectiveness of the point of oxidation is to employ relatively pure long chain α-olefins. Such processes are capable of producing fatty acids having 1 and 2 carbon atoms less than the starting olefin but the acids are generally present in small amounts, the bulk of the oxidate being comprised of shorter chain length acids, especially acetic and formic acid, and also much resinous polymeric materials. The α-olefin processes generally require very mild reaction conditions with long reaction times and low conversions. A further disadvantage of such processes is the increased cost of α-olefins compared to paraffins.

It would be highly advantageous to have a process for the preparation of synthetic fatty acids wherein the distribution of acids obtained is markedly improved, particularly, if such a process involved the oxidation of low cost and readily available hydrocarbons including paraffins. It would be even more desirable if the oxidation process could be conducted employing moderate reaction conditions while still obtaining an acceptable reaction rate.

SUMMARY OF THE INVENTION

It has now been found that by the co-oxidation of paraffin/olefin hydrocarbon mixtures in the presence of a heavy metal catalyst at atmospheric pressure that improved distribution to a narrow range of aliphatic monocarboxylic acids is obtained. The percentage of the predominant fatty acids varying in chain length up to about 4 carbon atoms is markedly increased over processes which employ the paraffin or olefin individually. The present cooxidation process provides a means for selectively and more efficiently oxidizing both the paraffin and olefin at reduced temperatures while maintaining an acceptable reaction rate so that long chain synthetic fatty acids can be obtained in good yield.

The process consists of oxidizing a hydrocarbon feedstock comprised of a normal paraffin or mixture thereof containing from about 12 to 40 carbon atoms and up to about 50% by weight of one or more olefins containing from 4 to 40 carbon atoms. The oxidation is carried out at a temperature between about 90° C. to 180° C. at atmospheric pressure or up to 500 p.s.i.g. or higher. About 0.01% to about 10% by weight based on the hydrocarbon feedstock of a heavy metal catalyst, preferably a catalyst comprised of a heavy metal organic compound and bromine or bromine-containing compound, is employed.

DETAILED DESCRIPTION

The present improved co-oxidation process utilizes as the major component of the feedstock to be oxidized a normal paraffin, or mixture of normal paraffins, containing from about 12 to 40 carbon atoms. It is most convenient to employ a mixture of paraffins since these materials are readily available as petroleum fractions. Normal paraffins containing from about 14 to 30 carbon atoms with a boiling range from about 250° C. to about 450° C. at 760 mm. Hg are especially useful since these give high yields of $C_{10}$ to $C_{20}$ fatty acids. The paraffin should be essentially free of branching and impurities such as cycloaliphatic materials and the like.

Included with the paraffin as an essential part of the feedstock to be oxidized are one or more olefins containing from about 4 to 40 or more carbon atoms. Preferably, the olefin will contain a single carbon-carbon double bond which may be in the alpha position or located internally. Especially useful for the production of long chain fatty acids are the straight chain α-olefins containing from 8 to 24 carbon atoms and olefins of the formulae

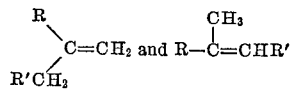

wherein R and R' are hydrocarbon radicals containing from 4 to 24 carbon atoms. By employing α-olefins it is possible to obtain an improved distribution of acids having only 1 or 2 carbon atoms less than the original olefin by proper selection of reaction conditions and parafin.

The selection of the olefin/paraffin combination is governed by the product distribution of fatty acids desired. For example if the predominant acid sought is a $C_{12}$ fatty acid, a $C_{22}$ paraffin or a $C_{20}$–$C_{24}$ paraffin mixture is co-oxidized with a $C_{13}$ or $C_{14}$ α-olefin or mixture of α-olefins. This will insure a product containing a predominant amount of fatty acids having 11 to 13 carbon atoms. Similarly if other fatty acid distributions are desired, the paraffins and/or olefin will be varied accordingly. It is especially significant that with the present co-oxidation process by proper selection of paraffin/olefin mixture and reaction conditions a significantly different product distribution can be obtained over conventional oxidation of either the olefin or paraffin alone. The percentage of the major fatty acid components having about a 4 carbon atom spread is markedly increased and in many instances this process can result in more desirable higher molecular weight fatty acids being produced. In general, the product distribution curve is much sharper with this process and sometimes shifted in favor of longer chain length acids than if either the paraffin or olefin is oxidized alone under identical conditions.

Up to about 50% by weight of the feedstock may be comprised of the olefin, however, due to economic and other practical considerations it is most desirable to employ as little of the α-olefin as possible to obtain the improved result. In general, it is preferred that the hydrocarbon feedstock contain about 10% to 30% by weight of the olefin with the remainder being the cheaper paraffin. The manner of addition of the olefin to the reaction mixture is not critical, however, in batch processes it is preferred to add the olefin in one charge at the outset of the reaction. If a continuous process is employed incremental addition of the olefin or proportioning by itself or with the paraffin and/or oxidate recycle may be advantageous. In most instances since the olefin is oxidized more rapidly than the paraffin it may be desirable to continuously meter an olefin-rich mixture to the reactor after the oxidation has been initiated. This can be accomplished by the use of any suitable metering device.

For conducting the co-oxidation a source of molecular oxygen is required. Air, being the most readily available, is preferred. Pure oxygen or substantially pure oxygen may be employed if desired. Mixtures of oxygen and ozone, oxygen and an inert gas or air and an inert gas may also be utilized. In general, any gas contaniing from 5% to 100% by volume molecular oxygen can be used.

The process may be conveniently carried out at atmospheric pressure. It may be advantageous, however, to operate at pressures up to 500 p.s.i.g. or higher. Most generally, the pressure will range from atmospheric up to about 350 p.s.i.g.

In the usual practice of this invention, the paraffin/olefin mixture is most conveniently oxidized with the catalyst being added directly thereto. Organic diluents may be employed to facilitate addition of the catalyst, etc. Diluents inert to the oxidizing conditions may be used. A small amount of water may be added to the reaction mixture to solubilize the catalyst.

The reaction temperature and conditions employed for the co-oxidation are controlled by two conflicting considerations. If good distribution is to be obtained and if the formation of undesirable by-products is to be minimized, moderate reaction conditions should be employed. On the other hand, optimum distribution with minimal by-product formation is favored by bringing the reaction mixture to the desired state of oxidation as rapidly as possible to avoid prolonged exposure to the oxidizing agent.

The present process is conducted at temperatrues ranging from about 90° C. to 180° C. More preferably a temperature between about 105° C. and 140° C. will be employed. In certain instances it is advantageous to initiate oxidation at a somewhat higher temperature and then after initiation has begun, as evidenced by evolution of heat and/or water, to decrease the temperature to a more preferred operating range.

While it is possible carry out the oxidation without a catalyst it is generally preferred and best results are obtained when a heavy metal catalyst is employed. The use of a catalyst permits the co-oxidation to be conducted at lower temperatures with acceptable rates. Known heavy metal catalysts suitable for the oxidation of paraffins may be employed and are within the scope of the present invention. Excellent results have been obtained when the catalyst is comprised of a heavy metal organic compound and bromine or bromine-containing compound.

The heavy metal portion of the catalyst may include heavy metals, per se, or deriavtives thereof which preferably exhibit some solubility in the paraffin/olefin mixture. The useful heavy metals have atomic numbers between about 23 and 84 and preferably have an atomic number from 23 to 28. The preferred metals include vanadium, chromium, manganese, iron, cobalt, nickel and mixtures thereof. Excellent results have been obtained when a mixture of manganese and cobalt has been employed. The heavy metal is most conveniently employed as the oxide or hydroxide or more preferably as a salt of the metal. Exceptionally useful salt forms include the naphthenates, toluates, acetates and salts of other organic acids or organic complexes such as acetylacetonate, 8-hydroxyquinolate and ethylenediaminetetraacetate. Inorganic salts such as borates, halides and nitrates may also be employed if desired. An especially useful catalyst system for the present co-oxidation process is one derived from ammonium bromide and a mixture of manganese and cobalt naphthenate or acetylacetonate.

The bromine may be present as elemental, combined or ionic bromine. Preferred bromine sources for the present catalyst systems include molecular bromine, ammonium bromide, hydrogen bromide, or other bromine-containing compounds. Other bromine containing materials such as potassium bromate, benzyl bromide, tetrabromoethane or the like will also yield satisfactory results. Excellent results are obtained when the bromine source is soluble or at least has limited solubility in the paraffin/olefin mixture.

The amount of the catalyst is not critical and the total catalyst concentration may range from about 0.01% to about 10% based on the weight of feedstock. The amount of the catalyst components can be varied so that the molar ratio of heavy metal to bromine will range from about 1:10 to about 10:1 and more preferably from 1:3 to 3:1.

Other compounds which may serve as oxidation promoters such as peroxides, hydroperoxides or other oxygenated compounds such as aldehydes and ketones may be included in the process to facilitate the co-oxidation. These may be present with or without the heavy metal catalyst system. It is possible to reduce the amount of catalyst employed by the addition of a small amount of crude oxidate, obtained by recycling, to the feedstock as it is charged to the reactor since the oxidized paraffin and other oxygenated materials present are excellent accelerators for the oxidation and shorten the induction period.

The following examples serve to illustrate the invention more fully, however, they are not intended as a limitation of the scope thereof. In these examples all percentages are on a weight basis unless indicated otherwise. The general procedure was to conduct the co-oxidation reaction in a 500 ml. resin flask equipped with stirrer, gas inlet, thermometer and a Dean-Stark trap fitted with a condenser. The rate of air addition was measured with a rotameter. Acid values (A.V.) were determined employing a modification of AOCS test procedure Te la–64 T.

At the completion of each reaction the oxidate was saponified by stirring with an excess of 10% aqueous sodium hydroxide. The organic and aqueous phases were then separated. The aqueous phase which contained the sodium soaps of the acids was extracted with petroleum ether and the residue obtained after evaporation of the petroleum ether was added to the organic phase. The aqueous soap solution was then acidulated with excess 50% sulphuric acid to recover the organic acids. The fatty acid distribution was determined by vapor phase chromatographic analysis after converting the acids to the methyl esters. Thin layer chromatographic analysis gave the hydroxy acid and lactone content present in the crude acid product.

The organic phase containing the unsaponifiable materials, hereinafter referred to as unsaps, was analyzed by vapor phase chromatography to determine the percent conversion of the paraffin and olefin. Unsaps refers to all materials capable of being recycled and further oxidized to produce acids such as with a continuous process or by use as all or part of the feed in a batch process. Such materials include unreacted olefin and paraffin and various intermediate oxidation products such as alcohols and ketones. Since the unsaps are useful materials the most meaningful way to express the efficiency of the process is to determine the amount of acids obtained from unsaps which have been completely converted. This effciency is defined as weight percent acid selectivity and is expressed by the formula:

Percent acid selectivity $$= \frac{\text{wt. of acids}}{\text{wt. unsaps charged} - \text{wt. unsaps recoverd}} \times 100$$

EXAMPLE I

One hundred twenty grams of a paraffin mixture comprised of $C_{15}$ to $C_{17}$ normal paraffins and 20 grams (14% of the charge) dodecene-1 were added to a reactor with a catalyst comprising 1.4 grams manganese naphthenate solution (6% manganese), 0.94 gram cobalt naphthenate solution (6% cobalt) and 0.25 gram ammonium bromide. Five-tenths ml. water was added and the reaction mixture heated to 150° C. with air metered in at a rate of 2.2 cu. ft. per hour. After about 15 minutes when initiation of the oxidation had commenced, as evidenced by the evolution of heat, the reaction temperature was reduced to 130–135° C. and maintained at this temperature for about one hour. The temperature was further reduced to about 115° C. and the reaction continued for about four hours until an acid value of 39.2 was reached. Paraffin and olefin conversion were 23% and 78%, respectively, with 83% acid selectivity. The distribution of the normal fatty acids obtained was as follows: 1.8% $C_5$; 4.7% $C_6$; 8.0% $C_7$; 10.0% $C_8$; 14.1% $C_9$; 20.0% $C_{10}$; 18.0% $C_{11}$; 9.4% $C_{12}$; 6.6% $C_{13}$; 4.6% $C_{14}$; 1.8% $C_{15}$; 1.0% $C_{16}$. Analysis indicated the acid fraction contained 14% hydroxy acids and 15% lactones.

EXAMPLE II

To demonstrate the improved results obtained employing a co-oxidation process 140 grams of the $C_{15-17}$ normal paraffin mixture was reacted with an identical amount and type of catalyst as described in Example I. No olefin was included in this reaction. After initiation of the oxidation the reaction temperature was maintained at 130–135° C. for 4 hours until the acid value of the oxidate was 38.4. Analysis indicated only 71% acid selectivity. The fatty acid distribution as determined by vapor phase chromatographic analysis was 2.7% $C_5$; 5.8% $C_6$; 9.87 $C_7$; 12.3% $C_8$; 13.0% $C_9$; 13.9% $C_{10}$; 12.1% $C_{11}$; 11.6% $C_{12}$; 8.3% $C_{13}$; 5.4% $C_{14}$; 2.9% $C_{15}$; 2.2% $C_{16}$. The acid product fraction also contained 17% hydroxy acids and 20% lactone.

It is evident by a comparison of Examples I and II that when an olefin is co-oxidized with the paraffin that improved acid selectivity is obtained with a reduction in the amount of undesirable by-products (hydroxy acids and lactones) formed. Also it is observed that the presence of an olefin has a marked effect on the distribution of the normal fatty acids obtained. While both processes yield acids having about the same range of chain lengths the distribution curve is much sharper with the co-oxidation process so that a higher percentage of the predominant fatty acids is obtained. Oxidation of the paraffin by itself gives a very broad acid distribution with $C_7$ to $C_{13}$ acids all being present in nearly the same amount whereas when the olefin is present under nearly identical conditions $C_9$–$C_{11}$ acids comprise nearly 60% of the normal acids produced and are present in significantly larger amounts than the $C_7$, $C_8$, $C_{12}$, and $C_{13}$ acids.

When dodecene-1 was oxidized by itself under identical conditions only 10% acid selectivity was obtained with a broad acid distribution ranging up to $C_{12}$. The oxidate also contained a very large amount (59%) of undesirable residue.

EXAMPLE III

To increase the conversion of the paraffin and olefin the co-oxidation was carried out for a longer period to obtain a higher acid value. The procedure employed was the same as described in Example I except that 105 grams of the $C_{15}$–$C_{17}$ paraffin and 35 grams dodecene-1 (25% of total feedstock) were employed. The catalyst type and amount were identical. After initiation the reaction temperature was maintained between 110° C. and 120° C. for 6.7 hours until an acid value of 67.9 was reached. Paraffin conversion was 85% and olefin conversion was 83%. Acid selectivity was 90%. The major fatty acid components present ($C_{8-11}$) comprised nearly 70% of the total acids with the predominant $C_{10}$ acid comprising 23.4% of the acid product.

For comparative purposes the reaction was repeated without the dodecene-1. Identical amounts and type of catalysts were employed. At a reaction temperature of 130–135° C., 7.3 hours were required to achieve an acid value of 66.6. A wide range of fatty acids were produced with about 70% of the acid product being comprised of $C_7$ to $C_{12}$ acids, all present in essentially the same amounts. That the incorporation of an olefin with the paraffin significantly affects the rate of oxidation is readily seen. The marked improvement of the fatty acid distribution is also evident.

EXAMPLE IV

To demonstrate the versatility of the present co-oxidation process, 120 grams of the $C_{15-17}$ paraffin and 20 grams octadecene-1 were combined with 1.1 grams manganese naphthenate solution (6% manganese). The reaction was carried out for about 4 hours until the oxidate had an acid value of 41.6. Paraffin conversion was 34% with 70% of the olefin converted. Acid selectivity was 83%. Acid chain lengths ranged up to and including $C_{17}$ with the predominant acids in the $C_{11}$–$C_{13}$ range.

EXAMPLE V

A high molecular weight paraffin and olefin were co-oxidized to obtain increased chain length fatty acids. In this reaction 105 grams of a $C_{19}$–$C_{22}$ normal paraffin mixture and 35 grams of a $C_{15}$–$C_{18}$ α-olefin mixture were co-oxidized in accordance with the procedure of Example I to an acid value of 67.0. Paraffin and olefin conversion were 42% and 81%, respectively, with 96% acid selectivity being obtained. Hydroxy acids and lactone formation was minimal. The fatty acid product obtained contained over 50% $C_{12}$ to $C_{16}$ normal fatty acids.

Employing a similar co-oxidation technique, a fatty acid product comprised predominantly of $C_{11}$ to $C_{15}$ normal fatty acids was obtained. The $C_{11}$ to $C_{15}$ acid soaps were prepared and employed in a conventional shampoo formulation and also made into bar soap. The isopropyl esters of $C_{11}$ to $C_{15}$ acids were also prepared and substituted for esters of natural products such as isopropyl myristate in a preshave lotion formulation and found to give comparable performance.

I claim:

1. A co-oxidation process to obtain an improved distribution of fatty acids wherein the predominant fatty acids vary in chain length up to about 4 carbon atoms which comprises reacting a hydrocarbon mixture comprising a normal paraffin containing from about 12 to 40 carbon atoms and an α-olefin containing from 8 to 24 carbon atoms, said α-olefin present in an amount up to about 50% by weight of the combined feedstock, with molecular oxygen at a temperature from about 90° C. to 180° C. in the presence of a heavy metal catalyst, said heavy metal having an atomic number from 23 to 28.

2. The process of claim 1 wherein the catalyst is comprised of a heavy metal compound and bromine or bromine-containing compound and the reaction is conducted at a pressure of about 350 p.s.i.g. and at a temperature between about 105° C. and 140° C.

3. The process of claim 2 wherein the paraffin contains from about 14 to 30 carbon atoms.

4. The process of claim 3 wherein the α-olefin comprises about 10% to 30% by weight of the hydrocarbon feedstock and the catalyst concentration is between about 0.01% and 10% based on the weight of the hydrocarbon feedstock.

5. The process of claim 4 wherein the heavy metal catalyst is comprised of ammonium bromide and a compound selected from the group consisting of heavy metal oxides, hydroxides or salts and the molar ratio of the heavy metal to bromine is between 1:10 and to about 10:1.

6. The process of claim 5 which is conducted at atmospheric pressure with a catalyst comprised of ammonium bromide and a compound selected from the group consisting of manganese naphthenate, manganese acetylacetonate, cobalt naphthenate or cobalt acetylacetonate with the molar ratio of the heavy metal to bromine between about 1:3 and about 3:1.

7. The process of claim 1 wherein a hydrocarbon feedstock comprised of a normal paraffin containing from about 14 to 30 carbon atoms characterized by boiling in the range 250° C. to 450° C. at 760 mm. Hg and between 10% and 30% by weight of an $\alpha$-olefin containing from 8 to 24 carbon atoms are co-oxidized at atmospheric pressure at a temperature between 105° C. and 140° C. in the presence of 0.01 to 10 weight percent based on the feedstock of a catalyst comprising ammonium bromide, cobalt naphthenate and manganese naphthenate having a molar ratio of heavy metal to bromine from about 1:3 to 3:1.

References Cited
UNITED STATES PATENTS 3,054,814   9/1962   Jason et al. _____ 260—413
3,557,169   1/1971   Robinson _____ 260—413

LEWIS GOTTS, Primary Examiner

E. G. LOVE, Assistant Examiner

U.S. Cl. X.R.

260—533 R